(12) United States Patent
Jones et al.

(10) Patent No.: US 11,301,742 B2
(45) Date of Patent: Apr. 12, 2022

(54) SMART PATCH

(71) Applicant: SATO HOLDINGS CORPORATION, Tokyo (JP)

(72) Inventors: Christopher A. Jones, Alsip, IL (US); Edward J. Kmet, Riverside, IL (US)

(73) Assignee: SATO HOLDINGS CORPORATION, Tokyo (JP)

( * ) Notice: Subject to any disclaimer, the term of this patent is extended or adjusted under 35 U.S.C. 154(b) by 136 days.

(21) Appl. No.: 16/415,265

(22) Filed: May 17, 2019

(65) Prior Publication Data

US 2020/0364526 A1 Nov. 19, 2020

(51) Int. Cl.
| | | |
|---|---|---|
| *G06K 19/00* | (2006.01) | |
| *B32B 7/00* | (2019.01) | |
| *B32B 27/00* | (2006.01) | |
| *B32B 37/00* | (2006.01) | |
| *B32B 3/00* | (2006.01) | |

(Continued)

(52) U.S. Cl.
CPC ............ *G06K 19/0776* (2013.01); *B32B 7/06* (2013.01); *B32B 7/12* (2013.01); *B32B 27/10* (2013.01); *B29C 2793/0054* (2013.01); *B29D 2030/726* (2013.01); *B32B 3/266* (2013.01); *B32B 37/06* (2013.01); *B32B 37/14* (2013.01); *B32B 38/0004* (2013.01); *B32B 2307/732* (2013.01); *B32B 2519/02* (2013.01); *C09J 7/38* (2018.01); *G06K 19/07754* (2013.01);

(Continued)

(58) Field of Classification Search
CPC ....... B06K 19/0776; B32B 37/06; B32B 7/12; B32B 27/10; B32B 2307/732; B32B 2519/02; B32B 7/06; B32B 37/14; B32B 3/266; B32B 37/12; B32B 38/0004; B32B 2425/00; G06K 19/0776; G06K 19/07764; C09J 7/38; C09J 9/00; C09J 2203/334; C09J 2203/326; C09J 2433/00; B29C 2793/0054; Y10T 156/1082; Y10T 156/1064; Y10T 156/108

USPC .................................................. 156/268, 257
See application file for complete search history.

(56) References Cited

U.S. PATENT DOCUMENTS

| | | |
|---|---|---|
| 7,338,914 B2 | 3/2008 | Conwell et al. |
| 8,025,238 B2 | 9/2011 | Jung et al. |

(Continued)

FOREIGN PATENT DOCUMENTS

| | | |
|---|---|---|
| CN | 206557821 U | 10/2017 |
| EP | 1 459 911 A1 | 9/2004 |

(Continued)

*Primary Examiner* — Linda L Gray
(74) *Attorney, Agent, or Firm* — Westerman, Hattori, Daniels & Adrian, LLP

(57) ABSTRACT

A Smart Patch comprising a label layer, an adhesive layer, a release liner layer and a RFID inlay, wherein the release liner comprises a separable inner release liner portion and a separable outer release liner portion; and the RFID inlay is adhered to a back surface of the inner release liner portion. The Smart Patches for uses including mounting to tires and other rubber materials. Methods of manufacturing including subjecting a release liner of the label to a die cut slightly larger than the size of an intended RFID inlay to form the separable inner release liner portion and outer release liner portion and applying a RFID inlay to a back surface of a release liner within the die cut inner release liner portion.

14 Claims, 4 Drawing Sheets

(51) Int. Cl.
  *B32B 38/00*    (2006.01)
  *G06K 19/077*   (2006.01)
  *B32B 7/06*     (2019.01)
  *B32B 27/10*    (2006.01)
  *B32B 7/12*     (2006.01)
  *B32B 37/06*    (2006.01)
  *B32B 3/26*     (2006.01)
  *B32B 37/14*    (2006.01)
  *B29D 30/72*    (2006.01)
  *C09J 7/38*     (2018.01)

(52) U.S. Cl.
  CPC ...... *Y10T 156/108* (2015.01); *Y10T 156/1064* (2015.01); *Y10T 156/1082* (2015.01)

(56) References Cited

U.S. PATENT DOCUMENTS

| | | | |
|---|---|---|---|
| 9,545,767 | B2 | 1/2017 | Roach et al. |
| 10,152,672 | B2 | 12/2018 | Janko et al. |
| 2003/0211273 | A1 | 11/2003 | Perry et al. |
| 2004/0095244 | A1 | 5/2004 | Conwell et al. |
| 2005/0059308 | A1 | 3/2005 | Parsons |
| 2006/0290505 | A1 | 12/2006 | Conwell et al. |
| 2007/0158436 | A1 | 7/2007 | Ichikawa et al. |
| 2008/0088448 | A1 | 4/2008 | Steidinger |
| 2014/0234577 | A1* | 8/2014 | Vogt .................. B32B 3/266 428/138 |
| 2017/0011664 | A1 | 1/2017 | Forster et al. |

FOREIGN PATENT DOCUMENTS

| | | |
|---|---|---|
| EP | 1 470 528 B2 | 10/2016 |
| JP | 2007232766 A | 9/2007 |
| JP | 2008186127 A | 8/2008 |
| JP | 200969935 A | 4/2009 |
| JP | 2017-531825 A | 10/2017 |

* cited by examiner

FIG. 3
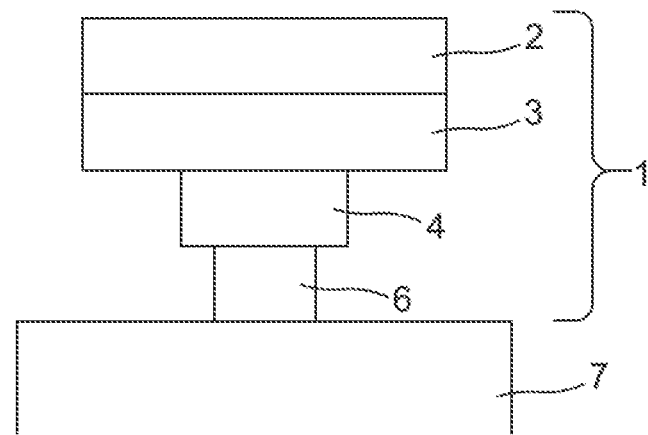
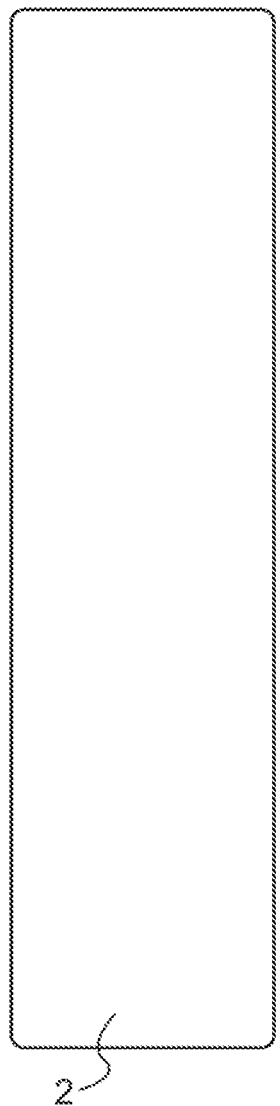
FIG. 4A
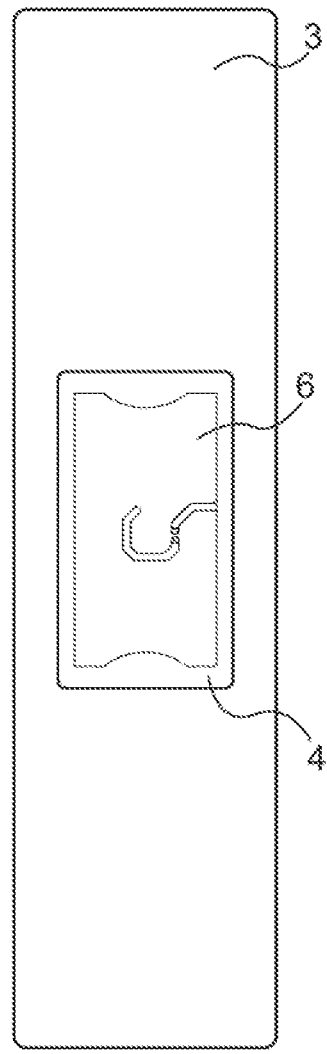
FIG. 4B
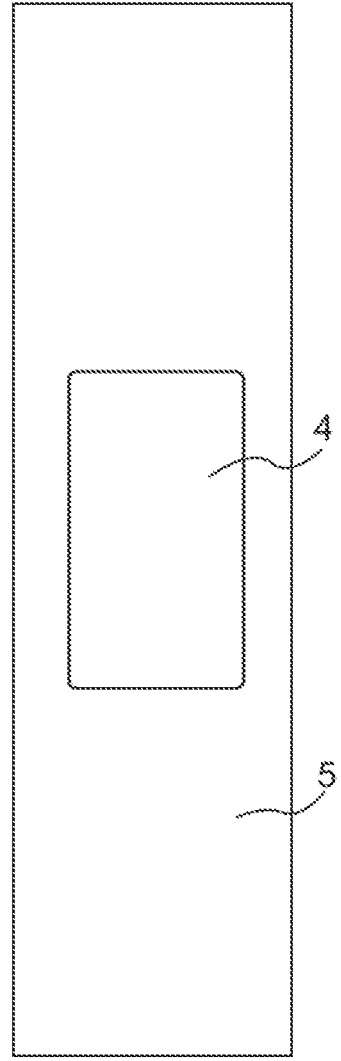
FIG. 4C

--Prior Art--

SMART PATCH

TECHNICAL FIELD

Non-limiting embodiments disclosed herein generally relate to the field of Smart Patches comprising Radio Frequency Identification (RFID) tags and labels, for mounting to tires and other rubber materials and to particular methods of manufacturing them.

BACKGROUND

Historically, tire manufacturers relied on hand stamping tires with lot and date codes using indelible ink or the use of raised bar code symbols directly embossed or molded into the surface of a tire to track and identify tires. However, these systems are low data density and so provide very limited flexibility for incorporating on-demand variable data. Further, the molding technology increases tire manufacturing costs. In view of these limitations, other technologies providing high-density machine readable data, including those which utilized radio frequency identification transponder (RFID) tags, gathered interest.

RFID tags and labels, or "Smart Patch" have a combination of antennas and analog and/or digital electronics, which may include for example communications electronics, data memory, and control logic. RFID tags and labels are widely used to associate an object with an identification code.

RFID tags and labels include active RFID, which include a power source, and passive RFID, which do not. In the case of passive RFID, in order to retrieve the information from the chip, a reader sends an excitation signal to the RFID. In general, RFID tags can retain and transmit enough information to uniquely identify inventory and the like.

RFID articles such as labels, tags, etc are typically provided as RFID inlays that carries the microchip and antenna on a convenient poly or paper base layer in a 'wet' format, i.e., coated on one side with a pressure sensitive adhesive for bonding the inlay to the article, or, in a 'dry' format with no adhesive.

Conventional manufacturing methods of a Smart Patch, as depicted in FIG. 6, includes the needs of de-lamination of a release liner from a label roll stock, application of the circuit components, re-lamination of a release liner and die-cutting to produce the desired patch. The process is generally conducted on high speed roll-to-roll production of RFID tag and label roll stock.

It appears that currently there is no process of mass producing RFID tire labels. Rather, tire labels require a manual process of hand applying an RFID inlay during label application to the tire. The currently process is thus cumbersome, decreasing efficiency and increasing cost.

SUMMARY

Technical Problem

Adhesives used in Smart Patches for tires are required to exhibit and maintain high adhesion strength to a tire in a wide range of temperatures and environments. The adhesive is required to be sturdy enough to withstand the tire manufacturing and assembly environment including warehouse storage, handling, shipping, trailers, conveyors, soaping, wheel mounting equipment, inflation, balancing, and load simulator operations and equipment. The adhesive is required to be able to resist abrasion stress, as well as interactions with components such as grease, oil, moisture, and UVB exposure. The adhesive is generally selected to resist the migration of plasticizer and other low-molecular weight additives within the rubber tire compound as the tire ages or becomes exposed to elevated temperatures.

Thus, the adhesives used in tire-labels are extremely strong and durable adhesives. Due to this, conventional methods of manufacturing RFID tire labels and tags are not practical.

Solution to Problem

In accordance with a first aspect disclosed herein, to address the above issue, the Inventors unexpected found that applying the RFID inlay to the back of the release liner eliminates the need to de-laminate and/or re-laminate the labels. In accordance with another aspect disclosed herein, the Inventors unexpected found that by subjecting the release liner to a die cut slightly larger than the size of the intended RFID inlay, this allows the inlay to be placed on the backside of the release liner within this die cut.

Advantageous Effects

In accordance with the first aspect disclosed herein, there is no necessity to expose the adhesive during the manufacturing process for the Smart Patch. In accordance with the second aspect disclosed herein, a small piece of liner is permitted along with the RFID inlay to come up with the tire label when removed from the remainder of the release liner. When applied to a surface, for example a tire, the RFID circuit is between the tire surface and the label. Leaving this small piece of liner between the circuit and the tire-label adhesive increases the performance of the circuit by creating a small barrier between the circuit and the adhesive which can adversely affect the performance of the RFID circuit.

These and other aspects and features of non-limiting embodiments will now become apparent to those skilled in the art upon review of the following description of specific non-limiting embodiments in conjunction with the accompanying drawings.

BRIEF DESCRIPTION OF THE FIGURES

The non-limiting embodiments will be more fully appreciated by reference to the accompanying drawings, in which:

FIG. 1a depicts a front surface of the Smart Patch. FIG. 1b depicts a back surface of the Smart Patch.

FIG. 3 is an example of Smart Patch according to according to a non-limiting embodiment wherein the Smart Patch is depicted in the affixed state to a tire surface.

FIGS. 4a, 4b and 4c are an example of a Smart Patch according to according to a non-limiting embodiment. FIG. 4a depicts a front surface of the Smart Patch. FIG. 4b depicts a back surface of the Smart Patch prior to application of the RFID inlay. FIG. 4c depicts a back surface of the Smart Patch after application of the RFID inlay.

Figure 1A:
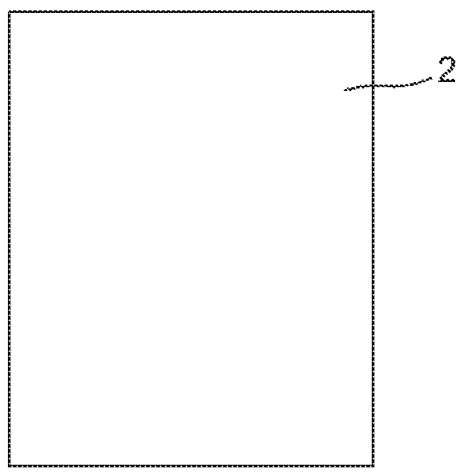
FIGS. 1a and 1b are an example of a Smart Patch according to according to a first non-limiting embodiment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DESCRIPTION OF NON-LIMITING EMBODIMENTS

Reference will now be made in detail to various non-limiting embodiment(s) of an identification and a monitoring system including a Smart Patch. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

As used herein, the terms RFID tags and labels, or "Smart Patch" can be used interchangeably.

Radio frequency transponders (also known as "RFID tags") generally include an antenna and integrated memory circuit with read/write capability used to store digital information, such as an electrically erasable programmable read only memory (EEPROM) or similar electronic device. Active RFID tags include their own radio transceiver and power source (battery) and are generally sealed within a molded plastic housing or "button". Passive RFID tags are energized to transmit and receive data by an electromagnetic field and do not include a radio transceiver or power source. As a result they are small and inexpensive. Passive RFID tag "inlays" or "inlets" used in the Automatic Identification Industry are typically laminated or inserted into label stock backed with a pressure sensitive adhesive for applying the printed label to an article to be tracked. These labels are commonly referred to as "smart labels".

The RFID label provides fast, reliable, accurate data collection without human error or replication. A pressure sensitive adhesive provides a means of affixing the RFID label to a surface of a tire without being labor intensive. The RFID label and adhesive system does not leave any damaging marks or surface cracks on the sidewall that would impact the functional performance or the integrity of the tire.

The RFID inlay is not particularly limited. It is desirable that the RFID chip should have sufficient memory to store the desired data and be capable of retaining the data for at least the life of a tire. It is desirable that the RFID chip maintain performance and function over a wide range of temperature stresses, for example an RFID chip that maintains performance and function over a range of temperature from about −40° C. to about 125° C.

In a non-limiting embodiment the inlay is an RFID with extended range due to inclusion of an antenna. The antenna is not particularly limited as long as the antenna can electrically connect to the RFID chip and conform to the shape of the tire. A non-limiting example of an antenna for use in an embodiment is a conductive ink applied via printing. For instance, an electrically conductive silver flake ink that is formulated for screen printing. The example is a non-limiting example and any type of conductive material including but not limited to steel, iron and aluminum can be used as the antenna.

Figure 1B:
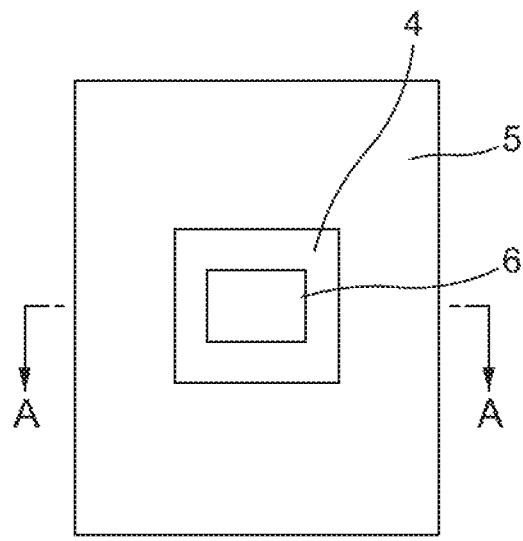
Figure 2:
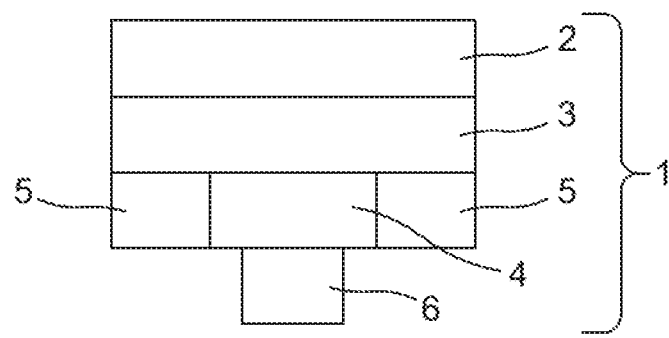
FIG. 2 is a cross-sectional view of A-A line from FIG. 1b.

With reference to the figures, a non-limiting embodiment will be described. FIG. 1a illustrates a face side of a label layer (2) of a tire label (1) according to a non-limiting embodiment. A face side of the label layer (2) can include any desired information thereon. FIG. 1b illustrates a back side of the label layer (2) of FIG. 1a. FIG. 2 is a cross-sectional view A-A line of FIG. 1b. The tire label (1) comprises label layer (2), adhesive layer (3), inner liner layer (4), outer release liner layer (5), and RFID inlay (6). FIG. 3 illustrates the tire label (1) in the affixed state to a tire surface (7).

The label layer (2) is not particularly limited as long as it able to resist tearing, abrasion, staining, grease, oil, heat, moisture, plasticizers, and UVB exposure. The label layer (2) is usually formed by film or paper materials. Non-limiting example may include a polyester label film, polyethylene terephthalate (PET), polyethylene napthalate, polypropylene, polyurethane, polyethylene, polystyrene, polycarbonate, polyolefin, polyamide, acetate, acrylic, acrylar, vinyl, polyvinyl fluoride, Tedlar, Tyvek, Teflon, and/or synthetic paper.

A film stiffness of the label layer (2) should be sufficient enough to allow good dispensing properties for self-stripping the label from the release liner on a label-dispensing unit, yet be flexible enough to conform to the curvature of a tire component, for example tire sidewall and treads. The label layer (2) should have lay-flat properties to reduce label creasing and wrinkling. A non-limiting example of film stiffness includes 20 and 80 mg (Gurley).

The label layer (2) may have a thickness of about 0.01 mm to about 1 mm, a thickness of about 0.02 mm to about 0.5 mm, a thickness of about 0.05 mm to about 0.2 mm, and a thickness of about 0.1 mm to about 0.2 mm. The label layer (2) can be thinner or thicker if necessary for the application. The surface area of the label layer (2) should be large enough to allow sufficient printable area.

These are only examples of what is specifically intended, and all possible combinations of numerical values between and including the lowest value and the highest value enumerated are to be considered to be expressly stated in this application.

The adhesive layer (3) is not particularly limited as long as it adequately adheres the tire label components to the tire material in a sufficient manner. The adhesive may exhibit a 180° peel adhesion force at a peel rate of 300 mm/min of 0.1 N/20 mm or greater, 1 N/20 mm or greater, 2 N/20 mm or greater, 3 N/20 mm or greater, 4 N/20 mm or greater, 5 N/20 mm or greater, 6 N/20 mm or greater, 7 N/20 mm or greater, 8 N/20 mm or greater, 9 N/20 mm or greater, 10 N/20 mm or greater, 11 N/20 mm or greater, 12 N/20 mm or greater, 13 N/20 mm or greater, 14 N/20 mm or greater, 15 N/20 mm or greater, 16 N/20 mm or greater, 17 N/20 mm or greater, 18 N/20 mm or greater, 19 N/20 mm or greater, 20 N/20 mm or greater, 21 N/20 mm or greater, 22 N/20 mm or greater, 23 N/20 mm or greater, 24 N/20 mm or greater, 25 N/20 mm or greater and 30N/20 mm or greater, when measured based on JIS Z 0237 (2009).

These are only examples of what is specifically intended, and all possible combinations of numerical values between and including the lowest value and the highest value enumerated are to be considered to be expressly stated in this application.

The adhesive is preferable a pressure sensitive adhesive. The adhesive can be any blend or combination of natural or synthetic rubber designed to adhere to tire rubber. For instance, any natural rubber, synthetic rubber, acrylic, urethane, and silicon adhesives conventionally known in the art can be used.

Non-limiting examples of the synthetic rubber adhesives include: ABA-type block copolymers such as a styrene/isobutylene/styrene block copolymer (SIBS), a styrene/butadiene/styrene block copolymer, and a styrene/isoprene/styrene block copolymer (SIS). A non-limiting example of an AB-type block copolymer, is styrene/isoprene block copolymer (SI).

In a non-limiting embodiment, the adhesives may be blended with a tackifier, a plasticizer, or an additive agent to control the adhesive strength or retention thereof.

Non-limiting examples of a tackifier include at least one of rosin-based resins such as a polymerized rosin, polymerized rosin ester, and a rosin derivative; a polyterpene resin, an aromatic denatured terpene resin and a hydride thereof, a terpene phenol resin, a cumarone-indene resin, an aliphatic petroleum resin, an aromatic petroleum resin and a hydride thereof, an aliphatic/aromatic copolymer petroleum resin, and a low molecular weight combination of styrene or substituted styrene.

A combination of two or more tackifiers having different softening points can be used to cope with a wide temperature range from low to high temperatures. For a combination of two or more different tackifiers having different softening points, the use thereof exerts excellent characteristics in both the adhesive strength and the ability of adhering on the rounded surface.

Non-limiting examples of plasticizer include a petroleum processed oil such as a paraffin-based oil, a naphthene-based process oil, or an aromatic processed oil; a natural oil such as a castor oil or a tall oil; dibasic dialkyl such as dibutyl phthalate, dioctyl phthalate, or dibutyl adipate; or a low-molecular weight liquid polymer such as liquid polybutene or a liquid polyisoprene.

Non-limiting examples of additive agents include fillers, inorganic and organic particles, pigments, dyes, coloring agents, oxidation inhibitors, UV absorbers, and light stabilizers.

The addition of additives, plasticizers and the like, may further aid in preventing or minimizing migration of components from the tire, affecting usability of the label.

The adhesive selected for label attachment is preferably a pressure sensitive rubber based system coated at a thickness of about no less than 0.1 mm: a thickness of about no less than 0.2 mm: a thickness of about no less than 0.3 mm: a thickness of about no less than 0.4 mm: a thickness of about no less than 0.5 mm: a thickness of about no less than 0.6 mm: a thickness of about no less than 0.7 mm: a thickness of about no less than 0.8 mm: a thickness of about no less than 0.9 and a thickness of about no less than 1 mm. The adhesive selected for label attachment is preferably a pressure sensitive rubber based system coated at a thickness of about no more than 5 mm: a thickness of about no more than 4 mm: a thickness of about no more than 3 mm: a thickness of about no more than 2 mm and a thickness of about no more than 1.5 mm. If necessary, thicker or thinner adhesives could be used depending on the tire surface.

A wide array of release liners can be utilized as inner release liner layer (4) and outer release liner layer (5). Release liners are well known and described in the prior art. Release liner could be constructed of either paper or film preferably having a thickness of about 10 µm to about 2000 µm. Preferably having a thickness of about 20 µm to about 1000 µm. Preferably having a thickness of about 30 µm to about 500 µm. The release liner can be thinner or thicker if necessary for the application.

Non-limiting examples of paper liners include a super-calendered glassine (BG) paper liner, Super Calendered Kraft paper, Clay Coated Kraft paper, Machine Finished Kraft paper and Machine Glazed paper. Non-limiting examples of plastic liners include a PET liner, a biaxially oriented Polypropylene (PP) film and other Polyolefins including, but not limited thereto, High-density polyethylene (HDPE) resins, Low-density polyethylene (LDPE) resins and Polypropylene (PP) plastic resins.

The side contacting the adhesive is generally coated with a release layer, typically a cured silicone or similar coating designed to release from the pressure sensitive adhesive.

Figure 5:
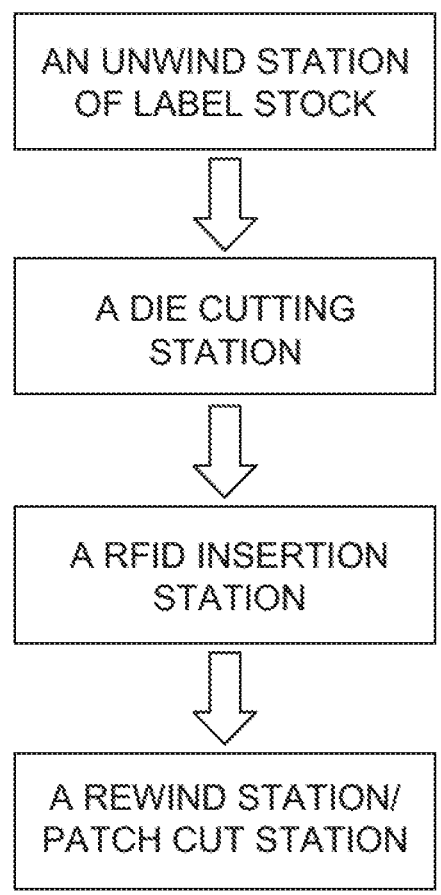
FIG. 5 is a flow diagram depicting a non-limiting manufacturing method of a Smart Patch according to according to a non-limiting embodiment.
Figure 6:
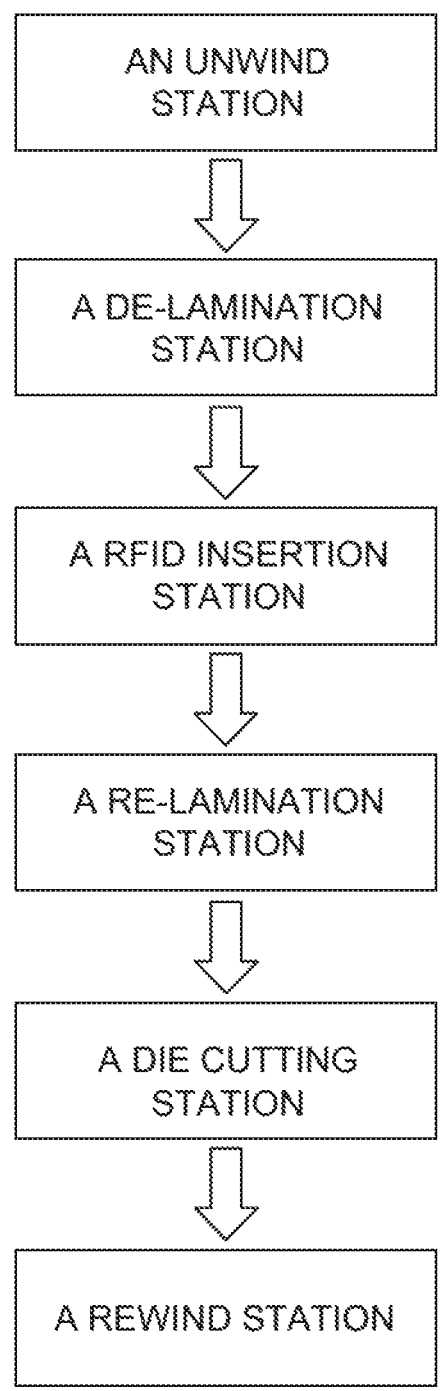
FIG. 6 is a flow diagram depicting conventional manufacturing methods of a Smart Patch.

Method of Manufacturing:

As depicted in FIG. 5, a label assembly is now described and includes the steps of initially providing a label stock comprising a label layer (2), having an adhesive layer (3) and release liner in that order, and then advancing the label stock to a die cutting station and die cutting the release liner to form inner release liner layer (4) and outer release liner layer (5). The die cut label is then advanced to a station for applying the RFID inlay (6). Optionally, the label can then be advanced to a rewind station and/or a final cutting station to produce either a roll of RFID tire labels or individual RFID tire labels.

In the die cutting station, the die cut inner release liner layer (4) is configured to be slightly larger than the size of the RFID inlay (6), allowing the circuit to be placed on the backside of the liner within the die cut. Further, the die cut inner release liner layer (4) is configured to be smaller than each of the individual label (i.e., tire label (1)).

A non-limiting example includes the die cut inner release liner layer (4) being no more than 80% of a width of the tire label, no more than 70% of a width of the tire label, no more than 60% of a width of the tire label, no more than 50% of a width of the tire label, no more than 40% of a width of the tire label, no more than 30% of a width of the tire label, no more than 20% of a width of the tire label, and no more than 10% of a width of the tire label. The die cut inner release liner layer (4) is no more than 80% of a length of the tire label, no more than 70% of a length of the tire label, no more than 60% of a length of the tire label, no more than 50% of a length of the tire label, no more than 40% of a length of the tire label, no more than 30% of a length of the tire label, no more than 20% of a length of the tire label and no more than 10% of a length of the tire label.

These are only examples of what is specifically intended, and all possible combinations of numerical values between and including the lowest value and the highest value enumerated are to be considered to be expressly stated in this application.

A non-limiting example of the size dimensions of the die cut inner release liner layer (4) includes about 50 mm by about 91 mm on an individual label that is about 304 mm by about 76 mm.

In the RFID inlay (6) application station, the unfinished label as depicted in FIG. 4*b* passes through the apparatus/conveyer while an applicator applies a 'wet' RFID inlay to the back of the liner within the die cut (inner release liner portion (4)). In the case of 'wet' RFID inlays, the RFID inlays may be supplied such as pressure sensitive labels on the release liner. In a non-limiting embodiment the adhesive of the 'wet' RFID inlay would be exposed on a back side of the inlay. When the RFID inlay (6) is applied to the inner release liner (4) in the predetermined position, the exposed adhesive adheres the RFID inlay to the inner release liner.

In manufacturing the tire label (1) as described above, a small piece of release liner, the die cut inner release liner (4), along with the RFID inlay (6) comes up with the label (1) when removed from the outer release liner (5). When applied to a tire surface (7), the RFID circuit is situated between the tire surface (7) and the label layer (2).

In leaving this small piece of liner between the circuit and the tire-label adhesive, increased performance of the circuit can be achieved by creating a small barrier between the circuit and the adhesive which can adversely affect the performance of the RFID circuit.

It is noted that the foregoing has outlined some of the more pertinent non-limiting embodiments. It will be clear to those skilled in the art that modifications to the disclosed non-limiting embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

INDUSTRIAL APPLICATION

The above describes an RFID label for application to a tire. Such tires can include pneumatic tires that are used on many types of vehicles, including cars, bicycles, motorcycles, buses, trucks, heavy equipment, and aircraft.

Again it is noted that the forgoing has outlined some of the more pertinent non-limiting embodiments. It is not intended to be restricted to any particular construction, or any particular arrangement of parts, or any particular application of any such construction or arrangement of parts, even where specifically shown and described herein, as the same may be modified, or may be applied in many varied relations, without departing from the spirit and scope of the disclosed non-limiting embodiments, which ought to be considered to be merely illustrative.

Thus, it is understood that the RFID labels can be positioned on other tires including solid rubber (or other polymer) tires that are used in various non-automotive applications, such as some casters, carts, lawnmowers, and wheelbarrows. The RFID labels can also be positioned on other non-tire rubber components and items.

REFERENCE SIGNS LIST

1 Tire Label: 2 Label Layer: 3 Adhesive Layer: 4 Inner Release Liner: 5 Outer Release Liner: 6 RFID Inlay: 7: Tire Surface

What is claimed is:

1. A method of manufacturing a Smart Patch, comprising the steps of;
    forming a label stock comprising a label layer, an adhesive layer and a release liner layer; wherein the adhesive layer is formed between the label layer and the release liner layer;
    subjecting the release liner layer to a die cut larger than a size of an RFID inlay forming a separable inner release liner portion and a separable outer release liner portion; and
    applying the RFID inlay to a back surface of the release liner layer within the separable inner release liner portion.

2. The method according to claim 1, wherein the label layer is formed of a film or a paper material.

3. The method according to claim 2, wherein the film is selected from the group consisting of a polyester label film, a polyethylene terephthalate film, a polyethylene napthalate film, a polypropylene film, a polyurethane film, a polyethylene film, a polystyrene film, a polycarbonate film, a polyolefin film, a polyamide film, an acetate film, an acrylic film, an acrylar film, a vinyl film, and a polyvinyl fluoride film; and the paper material is a synthetic paper.

4. The method according to claim 1, wherein the label layer has a thickness of 0.01 mm or no more than 1 mm.

5. The method according to claim 1, wherein the adhesive layer exhibits a 180° peel adhesion force at a peel rate of 300 mm/min of 0.1 N/20 mm to 30 N/20 mm.

6. The method according to claim 1, wherein the adhesive layer comprises a natural rubber, a synthetic rubber, an acrylic adhesive, a urethane adhesive, or a silicon adhesive.

7. The method according to claim 6, wherein the adhesive layer further comprises a tackifier, a plasticizer, or an additive agent.

8. The method according to claim 1, wherein the adhesive layer is a pressure sensitive rubber coated layer at a thickness of no less than 0.1 mm to no more than 5 mm.

9. The method according to claim 1, wherein the release liner layer is constructed of a paper or a film having a thickness of 10 μm or no more than 2000 μm.

10. The method according to claim 9, wherein the paper is selected from the group consisting of a supercalendered glassine paper, super calendered Kraft paper, clay coated Kraft paper, machine finished Kraft paper, and machine glazed paper; and the film is selected from the group consisting of a polyethylene terephthalate film, a biaxially oriented polypropylene film, a high-density polyethylene resin film, a low-density polyethylene resin film and a polypropylene plastic resin film.

11. The method according to claim 1, wherein a width of the separable inner release liner portion in a first direction is no more than 80% of a width of the label layer in the first direction, and a length of the separable inner release liner portion in a second direction is no more than 80% of a length of the label layer in the second direction.

12. The method according to claim 11, wherein the width of the separable inner release liner portion in the first direction is no more than 10% of the width of the label layer in the first direction, and the length of the separable inner release liner portion in the second direction is no more than 10% of a length of the label layer in the second direction.

13. The method according to claim 1, wherein applying the RFID inlay to the back surface of the separable inner release liner portion comprises adhering the RFID inlay to the inner release liner portion.

14. The method according to claim 13, wherein the RFID inlay is adhered via a pressure sensitive adhesive.

\* \* \* \* \*